United States Patent Office 2,822,390
Patented Feb. 4, 1958

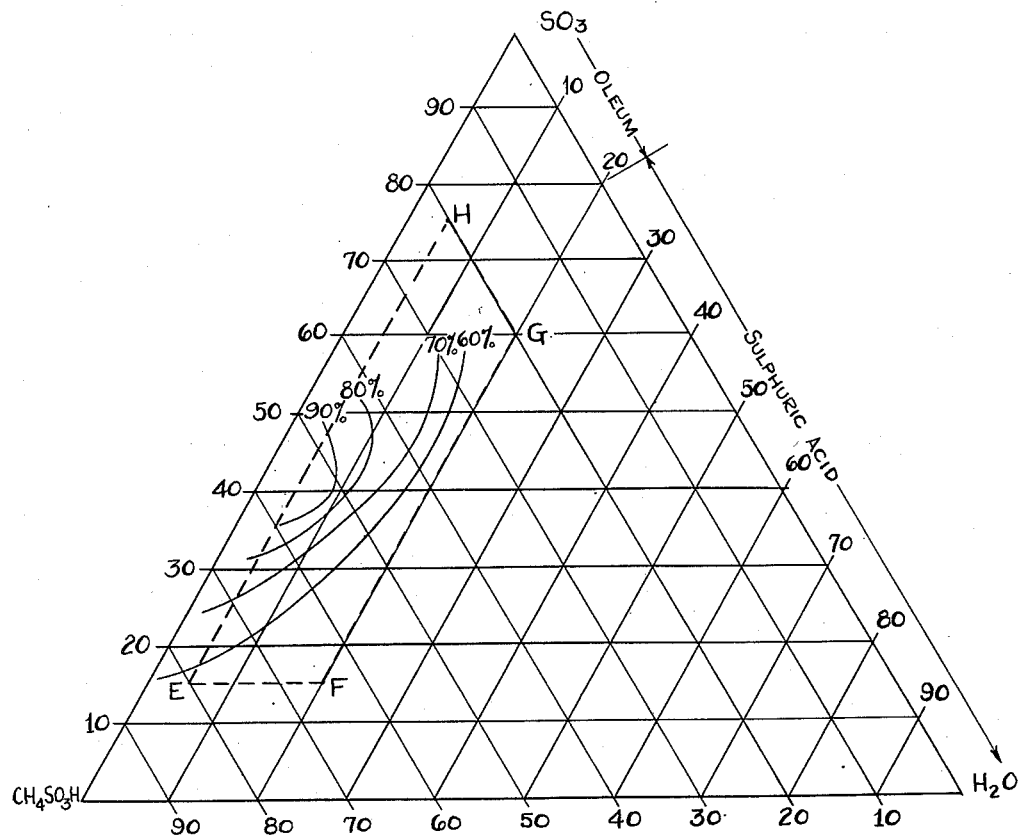

2,822,390
ALKYLATION OF UREAS

Harry E. Albert, Akron, Ohio, assignor to The Firestone Tire & Rubber Company, Akron, Ohio, a corporation of Ohio Application May 11, 1955, Serial No. 507,712

3 Claims. (Cl. 260—553)

This invention relates to an improved process for the alkylation of urea and N-alkylureas by reaction with tertiary olefins.

It is known that urea-type compounds such as urea and N-alkylureas may be reacted with tertiary olefins in sulfuric acid media to add alkyl groups onto the nitrogen atoms of the urea-type compounds. The process as heretofore practiced has the disadvantages of (1) relatively low yield, particularly of the preferred, N,N'-alkylureas, (2) extremely high viscosity of the reaction mixture, which renders agitation and contact of reagents extremely difficult and (3) the variable character of the reaction, which renders difficult the duplication of results.

Accordingly, it is an object of this invention to provide a novel and improved process for the alkylation of urea.

Another object is to provide such a process which will utilize a high proportion of the urea supplied to the process.

A further object is to increase the proportion of dialkylated ureas relative to the monoalkylated ureas produced by the process.

Another object is to provide such a process in which the reaction medium remains sufficiently flowable for ready and complete agitation and contact of the reagents.

Still another object is to provide such a process which will be characterized by consistent and reproducible results in successive runs.

The invention will be described in connection with the acocmpanying drawing, which is a trilinear diagram of the components (A) methyl acid sulfate, (B) water and (C) sulfur trioxide.

SYNOPSIS OF THE INVENTION

The above and other objects are secured, in accordance with this invention, in a process in which urea or an N-alkylurea is contacted with an isoolefin in a reaction medium comprising (1) concentrated sulfuric acid or oleum plus (2) methyl acid sulfate. The ultimate components of this reaction medium may be considered to be (A) methyl acid sulfate, (B) water and (C) sulfur trioxide, represented on the trilinear diagram of the accompanying drawing. On this basis, the components of the medium are employed in the following proportions:

[1] Percent

Sulfuric acid or oleum expressed as:
    (A) Methyl acid sulfate _____ 20–80
    (B) Water _____ 5–20
    (C) Sulfur trioxide (exclusive of the sulfur trioxide chemically combined in component A) _____ 15–75

[1] Based on the total weight of components (A), (B) and (C).

these proportions being represented on the polygon EFGH of the drawing. The percentage of urea or N-alkylurea supplied may vary from indefinitely small (there is no theoretical minimum; for economic practice, a minimum of 10% is suggested) up to 60%, based on the weight of the medium. The reaction is carried out at temperatures in the range −45° to +5° C.

THE REACTION MEDIUM

As noted above, this comprises a mixture of (1) sulfuric acid or oleum plus (2) methyl acid sulfate. Sulfuric acid and oleum grade continuously into each other, depending upon concentration, and may be considered as mixtures of sulfur trioxide and water in various proportions plotted along the $SO_3$—$H_2O$ axis in the chart of the drawing. The methyl acid sulfate, in isolated form, is a viscous liquid melting below −30° C. It may be separately prepared in advance, and mixed with oleum or sulfuric acid to form the reaction medium for use in this invention; or more conveniently, it may be prepared in situ, by mixing methanol with a molar excess of sulfuric acid or oleum in the appropriate ratio. The methanol reacts with the sulfuric acid or oleum to form the required methyl acid sulfate, and the excess sulfuric acid or oleum supplies the remainder of the reaction medium.

As to the proportions in which the components of the reaction medium should be supplied, a number of experiments were run as detailed in Example I hereinbelow, using the components in various ratios. The "nitrogen utilization" was determined for each experiment, and plotted as contours on the chart of the drawing, the percentage figures beside the several contour lines being the values of nitrogen utilization in experiments conducted with reaction media having compositions along the respective contour lines. The "nitrogen utilization" is the figure obtained by adding the percent yield of N,N-dialkylated urea to one-half the percent yield of N-monoalkylated urea; commonly, the alkylureas are used as intermediates in the production of alkylamines, and the "nitrogen utilization" is a measure of the efficiency of the alkylation step as a part of the overall synthesis of amines. High values of nitrogen utilization are desirable, and it will be seen that the area EFGH embraces such values. Particularly good results were obtained in the region of 50–60% methyl acid sulfate, 5–10% water and 35–40% sulfur trioxide.

THE UREAS AND TERTIARY OLEFINS EMPLOYED

The process of this invention may be applied to urea itself, or to N-alkylureas. Urea itself is alkylated either to the N-monoalkyl or the N,N'-dialkylurea according to the equations (1)

$$H_2N-CO-NH_2 + \underset{R^B}{\overset{R^A}{\diagdown}}C=C\underset{R^D}{\overset{R^C}{\diagdown}} \longrightarrow H_2N-CO-\underset{\underset{H}{|}}{\overset{\overset{R^A}{|}}{N}}-\underset{\underset{R^B}{|}}{\overset{\overset{R^C}{|}}{C}}-H$$

(I)                       (II)                          (III)

or (2)

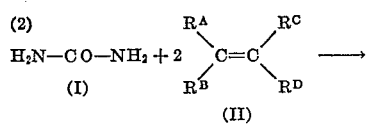

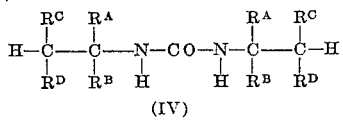

wherein $R^A$ and $R^B$ each represents an alkyl group of from 1 to 6 carbon atoms, and $R^C$ and $R^D$ each represents hydrogen or an alkyl group of from 1 to 6 carbon atoms, with the proviso that the total number of carbon atoms in $R^A$, $R^B$, $R^C$ and $R^D$ shall not exceed 8. It will also be understood that the radicals $R^A$ and $R^C$ may be joined to form, with the C=C group, a cyclic structure. If the reaction mass contains an N-alkylurea (either from the feedstock or from Reaction 1) which is already either mono- or di-alkylated on one of its nitrogen atoms, this will be further alkylated to a greater or less extent, depending on the time of contact, to an N,N'-alkylated product according to the reaction:

(3)

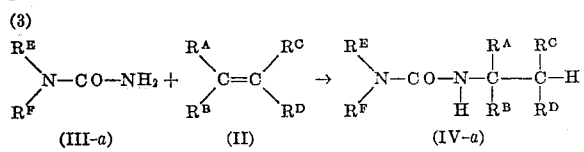

wherein $R^E$ represents hydrogen or an alkyl group of from 1 to 10 carbon atoms, and $R^F$ represents an alkyl group of from 1 to 10 carbon atoms. It is possible that Equation 2 represents the end result of Equations 1 and 3 occurring sequentially. As to the amount of the urea or N-alkylurea (III–a) to be charged to the reaction, there is no theoretical lower limit, as any infinitesimal amount of urea charged to the reaction mass will undergo alkylation. Economic considerations indicate that the minimum amount of urea or alkylurea should be at least 10%, based on the weight of the methylsulfuric acid plus sulfuric acid or oleum comprising the reaction medium. The upper limit of 60% of urea or alkylurea, based on the weight of methylsulfuric acid plus sulfuric acid or oleum, is imposed by the difficulty of stirring reaction masses containing more than this percentage of urea.

Referring to the N-alkylureas (III–a) which may form part or all of the feedstock used in this invention, these include for instance N-t-butylurea, N-t-amylurea, N-ethylurea N-methylurea, N-isopropylurea, N,N-dimethylurea, N,N-diethylurea, N-methyl-N-ethylurea, N-n-propylurea, N-sec-butylurea, and N-n-butylurea.

Isobutylene is the most available of the tertiary olefins utilizable in the reaction of this invention. However, any tertiary olefin containing up to 10 carbon atoms having the formula

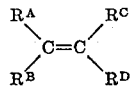

under the notation above, may be used. Suitable tertiary olefins will thus be seen to include isobutylene (already mentioned), diisobutylene, 2-methylbutene-1, 2-methylbutene-2, 2-methylpentene-1, 2-methylpentene-2, 3-methylpentene-2, 2,3-dimethylbutene-1, 2,3-dimethylbutene-2, 2-methylhexene-1, 2-methylhexene-2, 2,3-dimethylpentene-1, 2,4,4-trimethylpentene-1, 2,4,4-trimethylpentene-2, 2,4,4-trimethylhexene-1, 1-methylcyclohexene, and the like.

THE REACTION PROCEDURE AND CONDITIONS

The reaction is most conveniently carried out by preliminarily preparing the reaction medium from sulfuric acid or oleum and methanol, or from sulfuric acid or oleum and previously prepared methyl acid sulfate, as above described. The urea and/or alkylurea is then added to the reaction medium which has either been previously chilled, or is thereupon chilled, to reaction temperatures in the range −45° to +5° C. The reaction mass is thereafter kept in that range until completion of the reaction. Next the tertiary olefin is added, either as a liquid or as a gas, and thoroughly intermingled with the reaction mass by agitation. Because of the tendency of the tertiary olefins to polymerize under the reaction conditions, they should preferably be added in increments at about the rate at which they are consumed by the alkylation reaction. Since the urea and/or N-alkylurea are the more expensive materials, and since it is usually desired to maximize production of the N,N'-alkylureas, the supply of tertiary olefins is preferably kept up until the acceptance thereof into the reaction falls to an uneconomic low rate. Generally, a reaction time of 0.5 to 2.5 hours will suffice. The reaction conditions are then terminated, and the alkylated ureas recovered by any suitable means from the reaction mass. For instance, if the reaction mass is diluted with water, the N,N'-alkylureas (IV and IV–a) will be precipitated and may be recovered by filtration. The acid filtrate will contain the N-alkylated ureas (III) containing alkyl groups on only one of the nitrogen atoms; these may be precipitated by making the solution alkaline. The isobutylene polymers entrained with these precipitates may be removed therefrom by washing with petroleum ether or similar solvents.

With the foregoing general discussion in mind, there are given herewith detailed examples of the practice of this invention. All parts and percentages given are by weight, unless otherwise indicated.

Example I

Reaction medium:
  Urea _____ grams__ 30
  Oleum (strength per Table I) _____ Per Table I
  Methanol _____ Per Table I
  Water _____ Per Table I
  Isobutylene _____ Per Table I A series of runs was made in accordance with the foregoing schedule, varying the proportions of the constituents of the reaction medium. The runs were carried out in a 500 ml. three-necked flask, provided with a thermometer, a rotary stirrer, a gas sparger, and a dropping funnel. A Dry-Ice-acetone-alcohol bath was provided for cooling the flask. In each run, the oleum was charged first, and stirring commenced and maintained throughout the remainder of the operation until its discontinuance as indicated hereinbelow, and the methanol was added slowly at 0°–30° C. with cooling. Water, if required to bring the reaction medium to the desired composition, was added thereafter. The reaction medium was then cooled to −5° to −10° C. and the urea added and allowed to dissolve for several minutes. Isobutylene was bubbled into the reaction mixture through the sparger at the maximum rate possible without causing the temperature to rise above −5° C. When the reaction of the isobutylene with the urea had come to a standstill (usually in about 2 hours after commencement of introduction of the isobutylene into the mass) the introduction of isobutylene was discontinued and the polymerized isobutylene was decanted from the reaction mixture. The reaction mixture was then poured into ice water, and N,N'-di-t-butylurea was recovered from the mass by filtration and washed on the filter with water and petroleum ether. The filtrate was made alkaline with ammonia to precipitate the t-butylurea. The yield of the latter compound was corrected by the amount in solution in the aqueous filtrate to get the actual total yield. Following are particulars of the several runs.

TABLE I

| Oleum | | Methanol Added, g. | Water Added, g. | Composition of Reaction Medium, MeSO₄H/ H₂O/SO₃ | Alkylation Time, Hrs. | Isobutylene Absorbed, g. | Yield t-Butylurea (Percent based on urea) | Yield Di-t-Butylurea (Percent based on urea) | Nitrogen Utilization,[1] Percent | Run No. |
|---|---|---|---|---|---|---|---|---|---|---|
| Grams | Conc., Percent | | | | | | | | | |
| 90 | 30 | 10.8 | 10 | 33/20/47 | 2.0 | 60 | 74.0 | | 37.0 | 1 |
| 90 | 30 | 10.8 | | 37/12/51 | 2.5 | 106 | 55.6 | 41.8 | 69.6 | 2 |
| 90 | 30 | 10.8; 10 after ½ hr. | | 65/11/24 | 3.0 | 121 | 55.2 | 37.2 | 64.8 | 3 |
| 90 | 30 | 10.8 | 3.4 | 36/14/50 | 2.75 | 98 | 53.8 | 48.1 | 75.0 | 4 |
| 90 | 30 | 10.8 | 3.4 | 36/16/48 | 3.0 | 131 | 44.6 | 57.6 | 79.9 | 5 |
| 90 | 30 | 10.8 | 1.4 | 36/13/51 | 1.5 | 117 | 54.0 | 48.8 | 75.8 | 6 |
| 90 | 47.5 | 17.1 | 0.9 | 55/9/36 | 2.25 | 115 | 29.7 | 60.4 | 75.2 | 7 |
| 90 | 65 | 26.0 | 0.7 | 78/6/16 | 2.5 | 127 | 28.0 | 48.5 | 55.7 | 8 |
| 90 | 56.2 | 20.0 | 0.8 | 63/7/30 | 2.0 | 110 | 24.5 | 58.2 | 70.4 | 9 |
| 90 | 38.7 | 14.0 | 1.2 | 47/12/41 | 2.0 | 115 | 54.2 | 46.5 | 73.6 | 10 |
| 90 | 44 | 15.8 | 1.0 | 50/10/40 | 2.0 | 108 | 23.0 | 52.3 | 63.8 | 11 |
| 90 | 51 | 18.4 | 0.9 | 58/8/34 | 2.0 | 110 | 25.9 | 56.4 | 69.3 | 12 |
| 90 | 47.5 | 17.1 | 2.6 | 54/10/66 | 2.0 | 98 | 22.8 | 52.67 | 64.0 | 13 |
| 95 | 47.5 | 19.9 | | 61/8/31 | 1.5 | 130 | 26.6 | 57.8 | 71.1 | 14 |
| 95 | 47.5 | 18.1 | | 56/8/36 | 2.0 | 124 | 24.2 | 70.6 | 82.7 | 15 |
| 95 | 47.5 | 17.1 | | 53/8/39 | 1.5 | 138 | 24.5 | 75.6 | 87.8 | 16 |
| 95 | 47.5 | 16.6 | | 52/8/40 | 1.5 | 147 | 26.6 | 69.4 | 82.7 | 17 |
| 95 | 47.5 | 17.1 | | 53/8/39 | 4.5 | 160.5 | 29.6 | 76.7 | 91.5 | 18 |
| 97 | 40 | 14.5 | | 44/10/46 | 2.0 | 165 | 30.2 | 71.8 | 86.9 | 19 |
| 95 | 40 | 14.2 | | 55/10/35 | 2.0 | 136 | 27.6 | 69.3 | 79.6 | 20 |
| 95 | 53 | 19.2 | | 58/7/35 | 1.5 | 140 | 24.7 | 67.6 | 79.9 | 21 |
| 95 | 51 | 17.4 | | 56/8/36 | 2.0 | 145 | 29.3 | 71.8 | 86.4 | 22 |

[1] This figure is equal to the sum of the yield of N,N'-di-t-butyl urea plus one half the yield of N-mono-t-butyl urea; this represents the efficiency of the process if it is proposed ultimately to hydrolyse the alkylated ureas in order to obtain the amines.

*Example II*

Alkylation of mixture of urea and N-mono-t-butylurea:

|  | Parts |
|---|---|
| Urea | 22.5 |
| N-mono-t-butylurea | 13.4 |
| Oleum (47.5 free SO₃) | 95 |
| Methanol | 17.1 |

A stainless steel autoclave having a rotary stirrer, cooling jacket and gas inlet tube was provided for this example. The oleum and methanol were charged into the autoclave, and stirring commenced and continued throughout the subsequent operations. The mixture was then cooled to −10° C., and the urea and N-mono-t-butylurea were introduced and allowed to dissolve. The autoclave was then closed, and isobutylene pressured in through the inlet tube at the maximum rate possible while maintaining the temperature at −5° to −10° C. After two hours the reaction refused to accept further isobutylene, whereupon the polymerized isobutylene was decanted from the reaction mass, and the latter was diluted and filtered to recover the di-t-butylurea. This was washed on the filter successively with water and petroleum ether. The N-t-butylurea was recovered from the filtrate which had been made alkaline with a slight excess of ammonia. The yield was 60.7 parts of N,N-di-t-butylurea, and 17.5 parts of N-mono-t-butylurea. Based solely on the urea input and N,N'-di-t-butylurea output (without allowing credit for the 4.3 parts net gain of N-mono-t-butylurea) the percent of nitrogen utilization was 92%.

From the foregoing general discussion and detailed specific examples, it will be evident that this invention provides a novel and highly efficient process for the alkylation of ureas. The methanol and oleum employed in the preparation of the reaction medium are cheap and readily available, and at least the methanol can be largely recovered from the process. The process can be carried out without difficulty, in simple equipment, and with only a minimum of skilled attendance.

What is claimed is:

1. Process which comprises contacting, at temperatures in the range of −45° to +5° C. (I) a compound selected from the group consisting of urea, N-alkylureas in which the alkyl groups contain from 1 to 10 carbon atoms and mixtures of urea and said N-alkylureas, with (II) a tertiary olefin containing up to 10 carbon atoms, in the presence of (III) a reaction medium containing methyl acid sulfate and a substance selected from the group consisting of oleum and sulfuric acid having the composition

|  | Percent[1] |
|---|---|
| (A) Methyl acid sulfate | 50–60 |
| (B) Water | 5–10 |
| (C) Sulfur trioxide | 35–40 |

[1] Based on the total weight of (A), (B) and (C).

the reaction yielding mono-N-alkylated and di-N,N'-alkylated ureas in those cases where urea itself is selected, and yielding N,N'-alkylated ureas in those cases in which alkyl ureas are selected.

2. Process which comprises contacting, at temperatures in the range of −45° to +5° C. (I) urea with (II) a tertiary olefin containing up to 10 carbon atoms, in the presence of (III) a reaction medium containing methyl acid sulfate and a substance selected from the group consisting of oleum and sulfuric acid having the composition.

|  | Percent[1] |
|---|---|
| (A) Methyl acid sulfate | 50–60 |
| (B) Water | 5–10 |
| (C) Sulfur trioxide | 35–40 |

[1] Based on the total weight of (A), (B) and (C).

the reaction yielding mono-t-butylurea and N,N'-di-t-butylurea.

3. Process which comprises contacting, at temperatures in the range of −45° to +5° C. (I) urea with (II) isobutylene, in the presence of (III) a reaction medium containing methyl acid sulfate and a substance selected from the group consisting of oleum and sulfuric acid having the composition.

|  | Percent[1] |
|---|---|
| (A) Methyl acid sulfate | 50–60 |
| (B) Water | 5–10 |
| (C) Sulfur trioxide | 35–40 |

[1] Based on the total weight of (A), (B) and (C).

the reaction yielding mono-t-butylurea and N,N'-di-t-butylurea.

References Cited in the file of this patent

UNITED STATES PATENTS 2,548,585     Brown     Apr. 10, 1951

U. S. DEPARTMENT OF COMMERCE
PATENT OFFICE

CERTIFICATE OF CORRECTION

Patent No. 2,822,390　　　　　　　　　　　　　　　February 4, 1958

Harry E. Albert

It is hereby certified that error appears in the printed specification of the above numbered patent requiring correction and that the said Letters Patent should read as corrected below.

Column 3, line 51, after "ethylurea" insert a comma; column 5, line 32, for "47.5" read -- 47.5% --.

Signed and sealed this 20th day of May 1958.

(SEAL)
Attest:

KARL H. AXLINE　　　　　　　　　　　　　　　　　　ROBERT C. WATSON
Attesting Officer　　　　　　　　　　　　　　　　　Commissioner of Patents